United States Patent [19]

Westell

[11] 3,859,460

[45] Jan. 7, 1975

[54] PASSIVE IMAGE STABILIZATION SYSTEM

[75] Inventor: William E. Westell, Weston, Mass.

[73] Assignee: Baird-Atomic, Inc., Bedford, Mass.

[22] Filed: Nov. 27, 1972

[21] Appl. No.: 309,625

[52] U.S. Cl. ............ 178/7.2, 178/6.8, 178/DIG. 21, 178/DIG. 40

[51] Int. Cl. ............................................ HO4n 5/34

[58] Field of Search ..... 178/6.8, 6, 7.1, 7.2, DIG. 1, 178/DIG. 21, DIG. 40; 250/213 R, 213 VT

[56] References Cited

UNITED STATES PATENTS

| | | | |
|---|---|---|---|
| 3,371,161 | 2/1968 | Crovella | 178/7.2 |
| 3,518,372 | 6/1970 | Johns | 178/DIG. 40 |

*Primary Examiner*—Robert L. Richardson
*Attorney, Agent, or Firm*—Morse, Altman, Oates & Bello

[57] ABSTRACT

An image tracking sensor system mounted to an inertial platform generates an analog image displacement signal for passive image stabilization of a scene image viewed from the platform. A radiometric signal having a frequency proportional to the relative motion between the scene image and a reticle is generated by the convolution of the image with the reticle. This signal is detected and electronically processed in a DC square-root amplifier, a threshold decision logic and an analog to digital converter which generates a digital signal related to image velocity. The digital signal is measured by a digital differential analyzer doppler frequency comparator which generates digital signals defining image velocities relative to boresight. These digital velocities are integrated and displacements accumulated in a digital up-down counter tracking register. The accumulated displacements represent changes of image position relative to boresight. The accumulated digital displacements are read out of the tracking register by means of a digital to analog converter. An analog image displacement signal generated by the digital to analog converter is applied to the inertial platform for gyro-torquing stabilization control thereof.

22 Claims, 6 Drawing Figures

PASSIVE IMAGE STABILIZATION SYSTEM

BACKGROUND OF THE INVENTION

1. Field of the Invention

The present invention relates to stabilization systems and, more particularly, to optical image-stabilization systems of two types. The first type generates signals proportional to image displacements relative to boresight which null boresight motion in a true optical closed loop. The second type generates signals proportional to image absolute angular rates which control image motion compensation mechanisms in photographic and other imaging sensor applications requiring blur-free imagery for high resolution.

2. Description of the Prior Art

High acuity photographic and other reconnaissance systems require precise image stabilization for optimum performance. Gyro-stabilized optical viewing systems suffer from their inability to sense and correct for relative linear motions normal to their line of sight. Compensating computations from inertial information suffer from their instrumentation complexity and inaccuracies. In prior image stabilization systems, image correlation phase lock loops of various types have been used to detect phase differences between reticle frequency signals and reference signals or between recorded previous image phases and new image phases. Such phase lock loop image correlation systems have suffered from the disadvantage of limited accuracy due to the fact that, unlike communication systems, the phases from typical scenes are random and uncorrelated. Further, these phases change randomly with geometrical image changes such as occur with aspect ratio changes, image rotation and range of scale changes. These random phase changes result in unwanted and undesirable image tracking and resultant stabilization errors.

SUMMARY OF THE INVENTION

It is an object of the present invention to provide a passive image motion sensing and stabilization system which does not suffer from the aforementioned disadvantages. Expecially noteworthy are the photon-limited tracking capabilities which are orders of magnitude beyond the prior state of the art. The passive image stabilization system embodying the present invention comprises a sensor having a reticle operating as a spatial reference for generating a DC radiometric signal having a frequency proportional to the relative motion between a scene image and the reticle. This signal is detected and processed in a DC square root amplifier prior to being fed through a band-pass filter. The DC square root amplifier operates as an instantaneous photon shot noise AGC system for detection and estimation of signal fidelity. The DC square root amplifier incremental gain varies inversely as the square root of the DC radiometric signal such that the photon shot noise power spectral density, which varies directly as the square root of the DC radiometric signal, is held constant at all brightness levels for purposes of FM estimation and detection by AM-FM cross correlation described below. The signal at an output terminal of the band-pass filter is applied to a threshold crossing analog to digital converter and a zero crossing analog to digital converter. The digital signal at an output terminal of the threshold analog to digital converter is applied to a threshold decision logic and the digital signal at an output terminal of the zero crossing analog to digital converter is applied to a digital doppler frequency comparator which operates as a digital differential analyzer. The digital signal at the output terminal of the zero crossing analog to digital converter represents a phase measurement and the signal at an output terminal of the doppler comparator represents a frequency difference defining image displacements relative to boresight. The threshold decision logic controls a cross-correlation process which correlates signal amplitude changes relative to photon shot noise with image digital phase signals to reduce random phase errors by several orders of magnitude. A tracking register accumulates the image displacements in terms of up and down counts from the doppler comparator. The up-down counter is synchronized to the digital image phase signals such that initial phase errors and phase change errors unavoidably encountered by phase-lock-loop image-correlation techniques, are completely eliminated. The threshold decision logic operates in such a manner that a specified threshold must be exceeded before each zero crossing of the sensed image or the doppler frequency measurement is not entered into the tracking register. The signals generated by the tracking register are applied to a digital to analog converter which converts the accumulated digital displacement signals to analog signals defining position change. A differential displacement signal is provided by the tracking register by utilizaing a moving reticle operating as a relative spatial reference phase-locked to a stable crystal oscillator fixed frequency which is fed back to the doppler comparator. Alternately, an absolute rate signal is provided by utilizing a fixed reticle operating as an absolute spatial reference and by applying the signals generated by the tracking register to voltage controlled oscillator. A signal at an output terminal of the voltage controlled oscillator is fed back to the doppler comparator.

The invention accordingly comprises the system possessing the construction, combination of elements, and arrangements of parts that are exemplified in the following detailed disclosure, the scope of which will be indicated in the appended claims.

BRIEF DESCRIPTION OF THE DRAWINGS

For a fuller understanding of the nature and objects of the present invention, reference should be had to the following detailed description taken in connection with the accompanying drawings wherein.

DETAILED DESCRIPTION OF THE INVENTION

Figure 1:
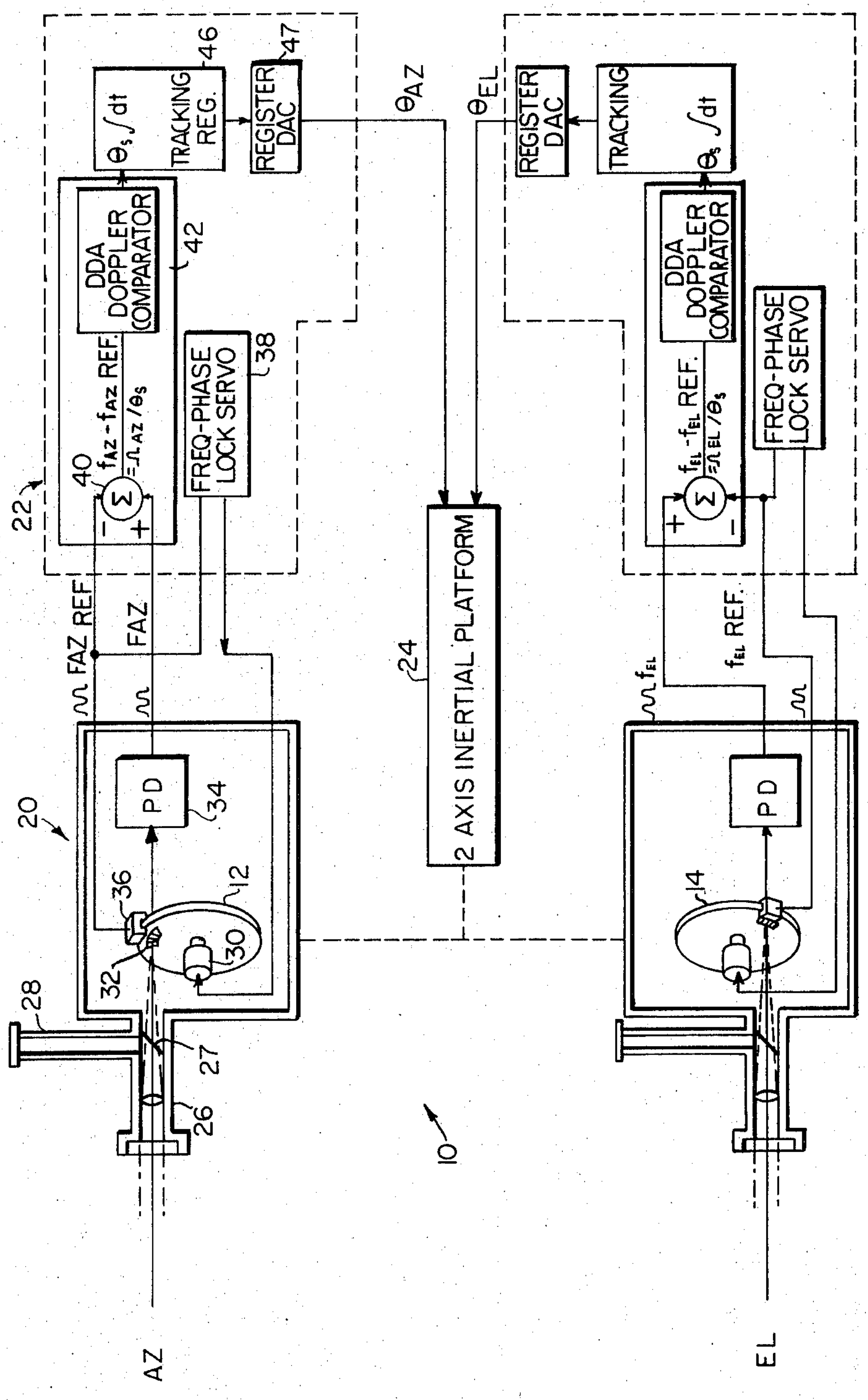
FIG. 1 is a side elevation, somewhat schematic of an image-motion nulling stabilization system of the first type embodying the invention.

As indicated above, high acuity photographic and other reconnaissance systems require precise image stabilization for optimum performance. The passive sensing techniques described below satisfy these requirements. The invention employes several unique and effective digital and analog optical and electronic image-information-processing techniques. With typical daylight scenes, these techniques provide a photon-limited digital image-tracking capability two to four orders of magnitude better than the actual optical resolution of the sensor optics; e.g., the dynamic tracking error typically is well under 1 microradian (10 nanometers rms in the image plane with a 5 millisecond stabilization-loop response). The contrast-weighted average of image displacements within the sensor field-of-view is passively measured within one millisecond with a dynamic resolution of one microsecond. Sensor tests have demonstrated that the tracking capability greatly exceeds the optical resolution down to twilight. Typical image stabilization applications result in reductions of image motion by eight orders of magnitude to 0.001 arc second. Typical line-of-sight stabilization applications result in stabilization to within 0.001 arc seconds CEP. The sensing techniques, while applicable to the entire electromagnetic spectrum, are particularly suited in practical applications to near or far infrared sensing of reflected solar of self-radiation, respectively.

The embodiments illustrated herein are characterized by optimum image motion sensing techniques which have the following characteristics:

a. Passive sensing;
b. Optimum sensing of any general scene;
c. A theoretical sensing accuracy limit that actually is achieved in practice; and
d. An optimum combination of direct optical correlation and hybrid electronic (analog-digital) cross-correlation to minimize size, weight, power, and cost and to maximize accuracy and reliability.

Image-processing techniques are described which actually achieve the ultimate theoretical accuracy for passive image motion sensing, limited only by the statistical variance of the finite number of photons from a given scene during a given observation time and by the information content (contrast) of the scene. These sensing techniques capitalize on the inherent spatial randomness of any general scene, such as the terrain of a planet. Thus, they are capable of detecting the motion of any random image and are not limited to images with point sources, edges, contours or other special signatures.

These optimum processing techniques minimize the instrumentation size, weight, power and cost required to achieve a given accuracy or performance by minimizing the electronic storage (image memory) capacity and accuracy requirements. This is accomplished by means of simple optical image correlation techniques prior to radiometric detection. Because the optically correlated radiometric signal is in a form suitable for direct digital processing after radiometric detection, maximum use is made of digital integrated circuitry instrumentation with associated accuracies, processing efficiencies, inherent reliability and minimized size, weight, power and cost.

The digital processing techniques optimally process the image motion phase-modulation information by cross-correlating (weighting) the quantitized samples of image motion information with the independently measured instantaneous signal to photon noise which is related to the information content of the sample. This cross-correlation occurs in the forward loop of a closed-loop system which typically averages hundreds to thousands of samples of image motion per second. Consequently, the closed loop system output provides optimally detected information of either image angular velocity or angular position (in the form of dead-reckoning displacements). The basic techniques described herein are applicable to the detection of linear velocities and displacements both normal to and along the sensor line-of-sight (LOS) by interferometric techniques with a colinear sensor pair. However, a discussion of these latter techniques is omitted in order to emphasize the basic techniques for precision sensing of image angular rates and displacements and the application of this information to angular image-motion-compensation (IMC) and angular line of sight stabilization in accordance with the present invention. Further, this disclosure concentrates on the processing techniques from a system point of view and does not discuss the relative merits of the different spectral bands of electromagnetic radiation over which these techniques apply. It is important to note that these sensing techniques can be used in any part of the electromagnetic spectrum in which energy can be collected, imaged, and detected.

Briefly, it has been established that practical, compact systems for the embodiment of these sensing techniques are photon limited at ultraviolet, visible, near infrared, intermediate infrared and far infrared wavelengths. The two spectral bands of prime interest are the near infrared for the detection of reflected solar radiation from planets or other bodies or for the detection of radiation from other celestial bodies, and the intermediate infrared for the detection of thermal radiation for day or night sensing capability for relatively cool bodies such as the terrain of planets. An absolute system of 99.99 percent has been demonstrated with typical terrains and illumination, which means that the total probable error of the sensor output is 0.01 percent. This error is equivalent to an angular error of 0.001 arc seconds in line-of-sight stabilization applications of the first type which is beyond the state of the art of high performance inertial systems, and to an angular velocity error of one arc second per second ($5 \times 10^{-6}$rad/sec) in the absolute value ratio velocity/height (V/H) sensing applications of the second type. These performances indicate the theoretical limit which can be achieved by the sensor. They represent the results of tradeoffs between accuracy and image motion dynamic range for practical instrumentation applications.

Referring now to the drawings, particularly FIG. 1, there is shown a two axis image stabilization system 10 for optical line of sight stabilization using space-time image encoding transformation and AM-FM correlation with digital doppler frequency comparison. The two axis system involves the convolution of a terrain image with small sections of rotating radical reticles 12, 14 orthogonally oriented for two-axis sensing. Two separate axes with optics are shown for clarity. It is to be understood that, in alternative embodiments a beam splitter and a single spatial rotating disc having orthogonally oriented reticles are used. A further alternate utilizes optical image rotations with prisms or mirrors prior to imaging of the two beams onto a single reticle. The convolution of terrain image with precision reticle is an optical (spatial) digital encoding of terrain spatial information. Thus, image displacements are digitally measured in units of precision reticle bars. Synchronous digital interpolation enables spatial measurements to be made orders of magnitude beyond sensor optical reticle resolution.

As previously indicated, two axis sensing is provided by relative orthogonal orientation of one axis, elevation EL, with respect to the other axis aximuth AZ. Since the EL axis and AZ axis are similar, it is to be understood that the following detailed description of one axis is applicable to the other axis.

Image stabilization system 10 comprises a sensor portion 20 for space-time image-encoding transformation and a sensor electronics portion 22 for processing the sensor portion signal and generating stabilization signals for control of an inertial platform 24 on which sensor portion 20 is mounted. Sensor portion 20 views a scene through a lens 26, for example a zoom lens. A reflex viewer 28 is provided for presenting the viewed scene to an operator by means of a beam splitter 27. The stabilized sight optics image the radiant energy from the scene to be stabilized onto rotating reticle 12, for example a sunburst pattern with radial bars 32, which is driven by a motor 30. The scene is thereby scanned by reticle bars 32 which digitally encode the spatial scene information from all elements of the entire scene simultaneously. The digitized scene information is transformed from spatial to temporal frequency through the angular scan rate of reticle 22. The relative angular rate between the scene and reticle 12 produces a doppler frequency which equals the relative angular rate between the scene and reticle times the number of reticle cycles per radian in the direction of reticle scan motion. The chopped scene image is detected by a photodiode 34 which generates a frequency signal $f_{AZ}$.

A line-of-sight optical reference frequency, $f_{AZ\text{-}REF}$, which corresponds to a stationary scene within the field of view, is detected by a photodiode and source 36 ideally coincident with the scene image. As hereinafter described, the optical frequency $f_{AZ}$ is locked to an electronic reference frequency by frequency-and phase-lock servo 38.

The $f_{AZ}$ and $f_{AZ\text{-}REF}$ signals are applied to a digital differential analyzer (DDA) doppler comparator 42 in sensor electronics portion 22. The resultant doppler difference frequency, i.e., the difference frequency between the scene frequency and the line-of-sight frequency, is the doppler frequency which provides angular rate information. This doppler difference frequency, which is proportional to image velocity, is greater or less than the stationary image frequency depending on whether the image moves against or with reticle motion. The doppler frequency is measured in digital differential analyzer doppler comparator 42 and integrated by an up-down counter digital integrator tracking register as shown at 46, to measure and accumulate by integration image displacements relative to boresight. The accumulated displacements are read out of register 46 by a register digital to analog converter 47 for stabilization control of inertial platform 24. The details of image stabilization system 10 is shown in FIG. 2.

Figure 2:
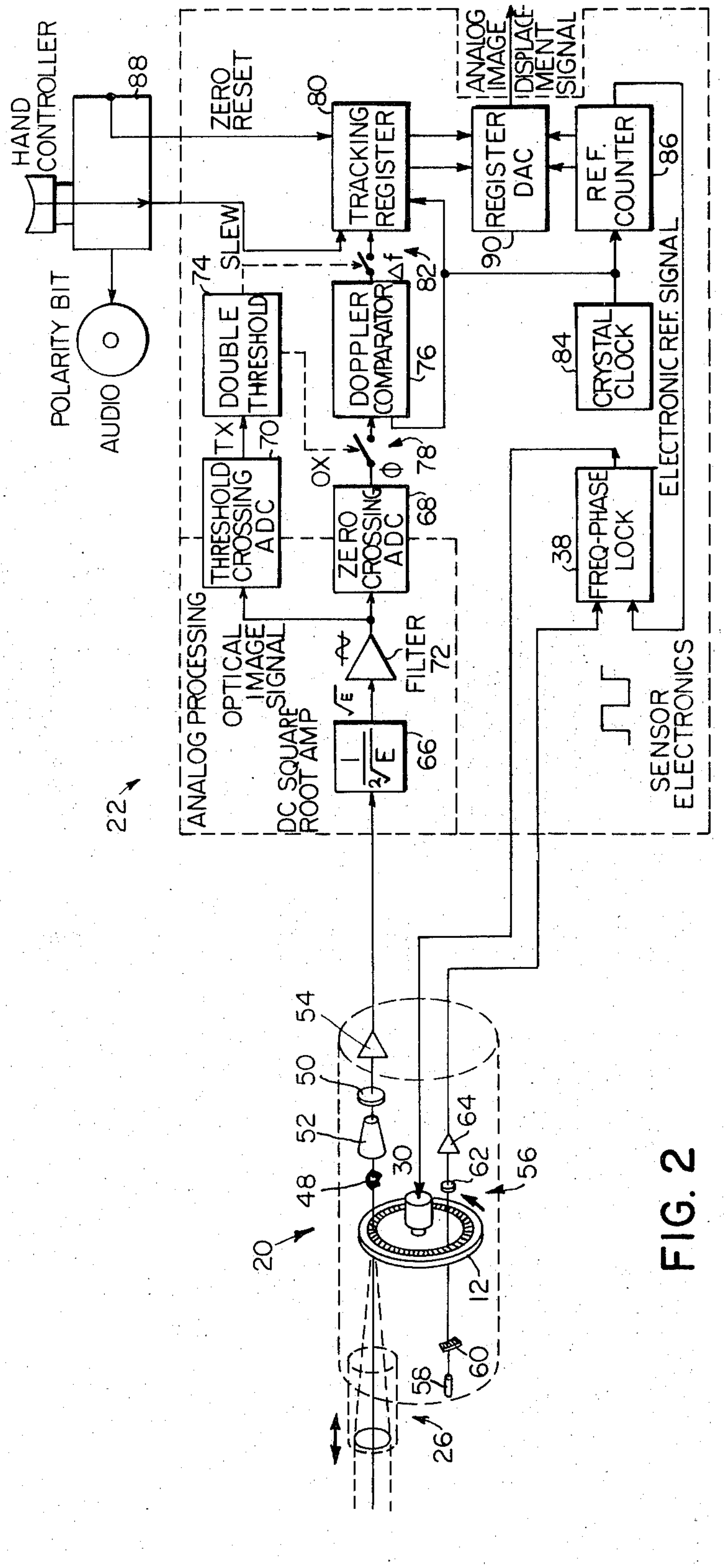
FIG. 2 is a block and schematic diagram of the image stabilization system of FIG. 1.

Referring now to FIG. 2, it will be seen that the scene image viewed through lens 26 is focused on rotating reticle 12. The chopped signal is transmitted through an apodization filter 48 and is optically coupled to a photodiode 50 via a light conduit 52. The scene image signal is detected by photodiode 50 and fed to sensor electronics section 22 via a DC preamplifier 54, the signal applied to sensor electronic section 22 denoted as the optical image signal. In the preferred embodiment, apodization filter 48 is a sharp-cuttoff, low-pass spatial filter which has a very low modulation transfer function (MFT) at the reticle spatial frequency (inverse of one reticle cycle). Apodization filter 48 reduces the field-of-view (FOV) modulation produced by reticle 12, chopping the edges of the FOV to below the photon noise level. In addition, apodization filter 48 minimizes image perturbations due to scene elements entering and leaving the FOV, for example range rate, aspect ratio changes and roll about line-of-sight. Apodization filter 48 defines the FOV and the half-power points equal the optical most significant bit (MSB). In the illustrated embodiment, the FOV is encoded into 5 optical bits; one reticle cycle is one optical least significant bit (LSB); i.e., there are 32 reticle cycle between FOV (apodization filter 48) half-power points. The apodization filter 48 function in space domain is a cumulative Gaussian with standard deviation equal to one reticle cycle (LSB). Thus, the MTF is the product of the Gaussian transform and sin $x/x$ due to MSB transform (rectangular FOV function).

An optical reference signal for control of motor 30, for example an AC torque motor, is generated by a reference unit 56 in sensor portion 20. Reference unit 56 is ideally located coincident with the image field of view defined by apodization filter 48, but is shown separated in FIG. 2 for purposes of clarity. The image and reference radiation beams are separated by well known off-axis imaging techniques which can be augmented by dichroic reflex techniques. In the reference unit 56, a reference reticle 60 illuminated by an optical reference lamp 58 is convolved with moving reticle 12. The resultant optical reference signal is detected by a photo-detector 62 and applied to a frequency and phase-lock servo 38 via a preamp and zero-crossing analog to digital converter 64. The signal fed to phase-lock servo 38 is denoted as the optical reference signal. The optical reference is precisely synchronized in time and space to rotating reticle 12 in such a manner that the reticle cycle has a 10 bit electrical resolution and the FOV is spatially digitized simultaneously into 5 optical bits and 15 electrical bits. The frequency and phase-lock servo processing utilizes digital signal processing similar to the image signal processing. For simplicity, in view of the fact that the processing operations derive frequency and phase operations in the same manner as elsewhere described for the image motion measurements employing doppler comparator 42 and 76, tracking register 46 and 80 and register DAC 47 and 90, with the exception that the threshold decision logic 74 is omitted, reference should be had to detailed descriptions of these sections for a fuller understanding of frequency and phase-lock sensing operations which are used in a type II servo loop. The remainder of the phase-lock loop design employs well-known state-of-the-art techniques. The use of these phase and frequency digital sensing techniques results in a new state of the art micropositioning precision, for example better than one micrometer in space and one microsecond in time. These techniques are also particularly suitable to digital image-motion compensation devices discussed later.

In the illustrated embodiment, the zoom optics 26 are T/4.0. Since the reciprocal of the signal-to-noise ratio ($SNR^{-1}$) varies directly as T/No. for photon-limited high level operation and as $(T/NO.)^2$ for lower level operation, a large improvement is made in optical efficiency, particularly noticeable at lower high level operation because of the $(T/No.)^2$ relationship. The sensor optics are such that the system provides photon-limited tracking performance which is up to four orders of magnitude better than the optical resolution of the sensor optics 26.

As previously indicated the optical image signal is fed to sensor electronics portion 22. The optical image signal is applied to a non-linear electronic unit 66 in which the incremental gain is caused to vary inversily as the square root of the optical image signal for photon-limited signal detection and estimation. In the illustrated embodiment, by way of example, non-linear electronic unit 66 is a DC square root amplifier which operates as a photon-noise automatic gain control. It is to be understood that, in an alternate embodiment, the incremental gain is varied by means other than electronically, for example the incremental gain is varied optically by means such as an iris in sensor section 20. Detector 50 and preamp 54 dark noise dominates up to 3.2ua DC detector current. Above 3.2ua, scene-radiation photon shot noise dominates, increasing as $\sqrt{I/3.2ua}$ over $10^{-12}$ $A/Hz^{1/2}$ dark noise. The incremental gain of DC square root amplifier 66 compensates this, decreasing as $\sqrt{I/3.2ua}$. In other words, DC square root amplifier 66 operates as an instantaneous photon-noise automatic gain control, regulates the combined photon shot noise and dark noise power-spectral-density to a constant value and provides optimum FM predetection estimation over the full range of terrain radiances and contrasts. Compensation at the breakpoint cross over between photon shot noise and dark noise is maintained by introducing a bias at the input of DC square root amplifier 66. The signal at the output of square root amplifier 66 is applied both to a zero crossing analog to digital converter 68 and to a threshold crossing analog to digital converter 70 via a band-pass filter 72, for example 800 ± 400 Hz which corresponds to 20 ± 10 cm/sec in the image plane or 3.33 ± 1.67 rad/sec at a nominal focal length of 60 mm. Band pass filter 72 operates to maximize image signal to combined photon and dark noise. Zero crossing analog to digital converter 68 and threshold crossing analog to digital converter 70 are analog comparators with binary outputs having excellent time resolution of the null crossing. Analog to digital converters 68 and 70 have a ± ½ sigma noise-level hysteresis to avoid false triggering at low signal amplitude. The input and digital outputs of analog to digital converters 68 and 70 are well guarded to avoid electrical pickup. Particularly objectionable is electrical reference (800 and 400 Hz) pickup which would produce a position offset, increasing with lower-signal-to-noise ratio. Zero crossing analog to digital converter 68 maximizes the image doppler correlation, Signal-to-Noise Ratio limited by combined noise, by optimized correlation measurements at the image-signal zero crossing times when the rate of change is maximized with respect to noise. Threshold crossing analog to digital converter 70 provides a digital AM-threshold FM cross-correlation optimum estimation process which eliminates dropouts due to terrain image fluctuation such as occur with geometrical image changes described previously. The signal at an output terminal of threshold crossing analog to digital converter 70 is applied to a double-threshold decision logic 74 and a digital phase signal $\phi$ at an output terminal of zero crossing analog to digital converter 68 is applied to a doppler comparator 76 via a logic gate switching device 78. A frequency difference signal $\Delta f$ at an output terminal of doppler comparator 76 is fed to an up-down counter tracking register 80 via a switching device 82. Switching devices 78 and 80 are controlled by double threshold decision logic 74 in such a manner that the threshold must be exceeded before each zero crossing or the period measurement is not entered into tracking register 80. This anticipates nulls before they occur, due to threshold level to combined noise ratio of 7. Double threshold decision logic 74 provides an optimum FM statistical estimation of the joint probability of the tracking accuracy of each millisecond sample, anticipates rapid image perturbations (range rate, aspect ratio changes, etc.) before the associated tracking errors are entered into tracking register 80. That is, double threshold decision logic 74 acts as an electronic clutch which momentarily disengages tracking register 80 from the scene during violent image distortions which are indicated by associated amplitude fluctions of the AM image signal. Doppler comparator 76 is a digital doppler frequency detector which measures millisecond image displacements with an FM detection precision limited only by photon noise. The measurement by doppler comparator 76 is a digital auto-correlation process which makes an optimum statistical estimate of image displacement, i.e., provides in practice the highest accuracy theoretically possible within a given measurement time.

Figure 3:
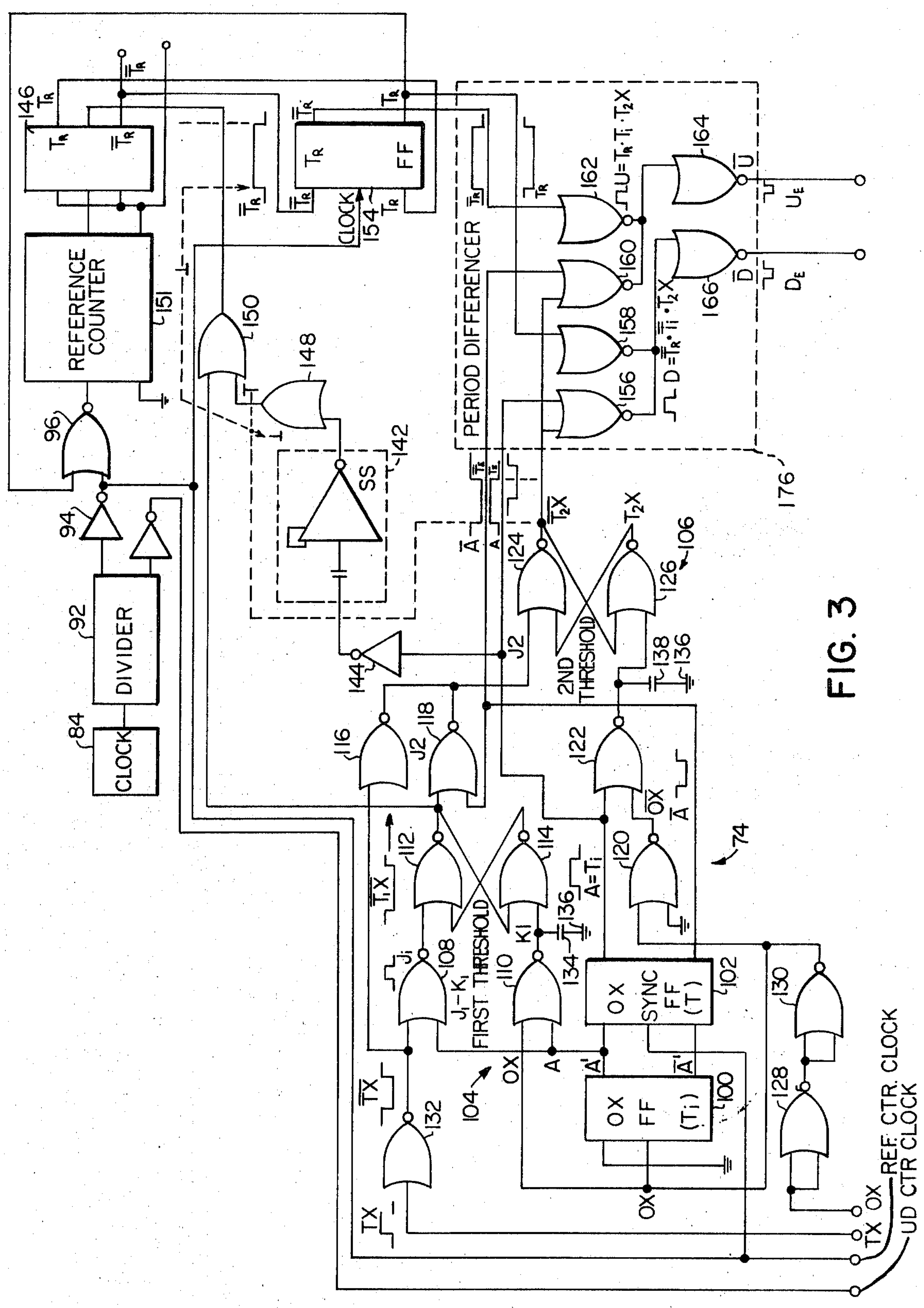
FIG. 3 is a detailed schematic of the double-threshold decision logic and doppler comparator of FIG. 2.

As hereinafter described in connection with FIGS. 3, 4A and 4B, a clock 84 for example a crystal clock generates a digital reference frequency which is applied to doppler comparator 76 tracking register 80 and a reference counter 86. Referring now to FIG. 3 which shows logic diagrams of doppler comparator 76 and double threshold decision logic 74, logic operation begins with doppler comparator 76 reference counter 151 countdown which is initiated by the first zero crossing if the threshold is exceeded during the half-cycle immediately prior. The period (time) difference between scene and reference periods is taken with clock-synchronized logic and, if the threshold is exceeded in the half cycle prior to the second zero crossing, gates up or down clock pulses into tracking register 80 which sums bipolar slew rate generated by a hand controller 88 and stops rollover counts from entering tracking register 80.

Tracking register 80 accumulates image displacements in terms of up and down counts from doppler comparator 76. The count represents time differences which, averaged over the measurement cycle, represents velocity differences. In the illustrated embodiment, tracking register 80 is a digital updown counter which stores a continuously updated best estimate of image displacements and holds that estimate during momentary interruptions of radiometric inputs and momentary image perturbations. Tracking register 80 provides image tracking displacement information suitable for optical stabilization of a gyro-stabilized sight system. By way of example, tracking register 80 is a 15 bit synchronous up-down counter, the 15th bit being a polarity bit. The 10 most significant bits of tracking register 80 are converted to analog signals in a digital to analog converter (DAC) 90 which generates analog signals for control of the stabilized inertial loop.

Figure 4A:
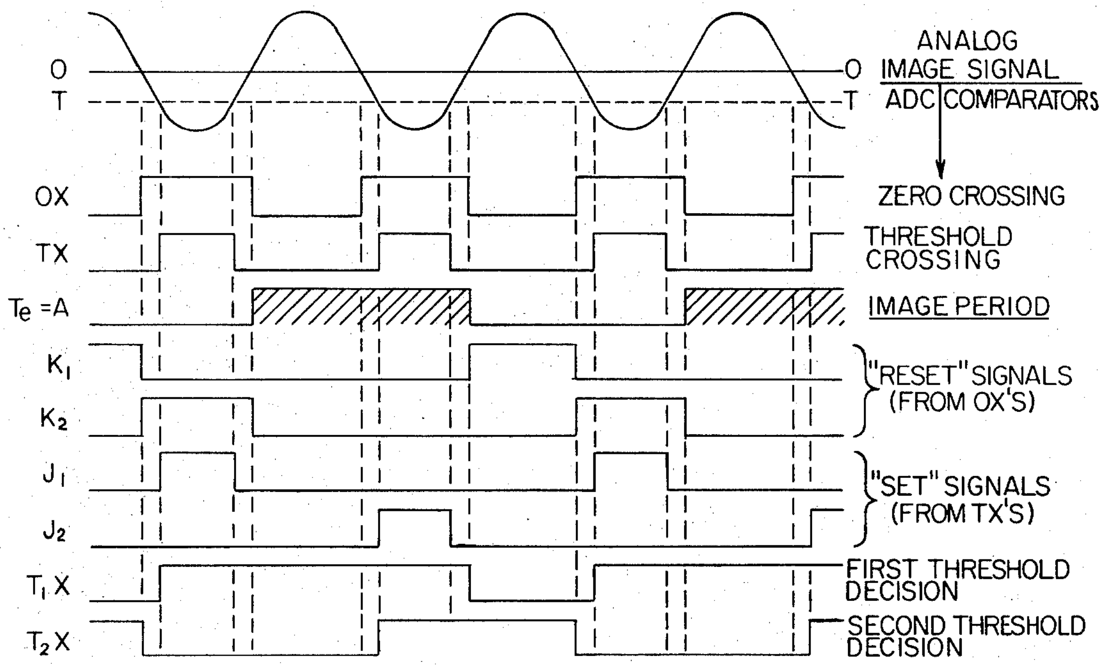
FIGS. 4A and 4B are logic timing diagrams for FIG. 3.
Figure 4B:
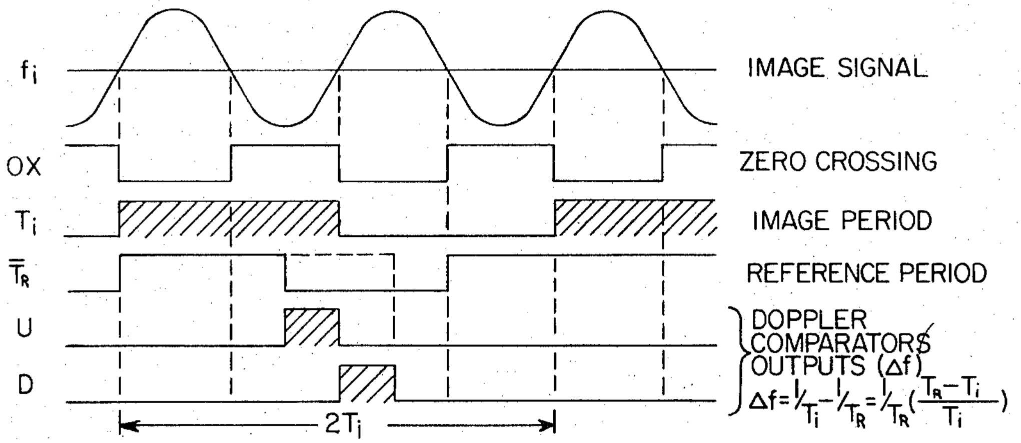

For a fuller understanding of the invention, reference is now made to FIGS. 3, 4A and 4B. Crystal clock 84 generates a clock signal frequency of 3.27680 M Hz for example which is divided in a divider 92 and fed to a buffer 94. The divided clock signal, 0.8192 M Hz for example at an output terminal of buffer 94 is applied to one terminal of a two terminal NOR gate 96 and double threshold decision logic 74.

Double threshold decision logic 74 comprises an unsynchronized zero crossing flip-flop 100, a synchronized zero crossing flip flop 102, a first threshold circuit 104 and a second threshold circuit 106. First threshold circuit 104 includes NOR gates 108, 110, 112, and 114. NOR gates 112 and 114 are connected in a latch configuration. Second threshold circuit 106 includes NOR gates 116, 118, 120, 122, 124 and 126. NOR gates 124 and 126 are connected in a latch configuration. The zero crossing signal OX at the output terminal of zero crossing analog to digital converter 68 is applied to zero crossing flip-flop 100, NOR gate 110 and NOR gate 120 via serially connected NOR gates 128, 130. The threshold signal TX at the output terminal of threshold crossing analog to digital converter 70 is applied to NOR gate 108 via a NOR gate 132. The clock signal generated by buffer 94 is applied to zero crossing flip-flop 102 for image period clock synchronization. The signal at the one terminal of zero crossing flip-flop 100 is applied to NOR gates 108, 110 and zero crossing flip-flop 102. NOR gates 108 and 110 also receives the complement threshold signal $\overline{TX}$ at the output of NOR gate 132 and the OX signal at the output of NOR gate 130, respectively. The signal at the zero terminal of zero crossing flip-flop 100 is applied to zero crossing flip-flop 102. A signal J1 at the output terminal of NOR gate 108, a set signal derived from the threshold $\overline{TX}$, is applied to NOR gate 112 and a signal K1 at the output terminal of NOR gate 110, a reset signal derived from the zero crossing signal OX, is applied to NOR gate 114. A noise-isolation capacitor 134 is connected between the output terminal of NOR gate 110 and a return 136. The complement of a first threshold decision signal $\overline{T_1X}$ at an output terminal of NOR gate 112 is applied to NOR gate 118 and the complement threshold signal $\overline{TX}$ is applied to NOR gate 116. Also applied to NOR gate 118 is the signal at the zero terminal of zero crossing flip-flop 102. The image period signal $T_i$ at the one terminal of zero crossing flip-flop 102 is applied to one terminal of NOR gate 122 and the zero crossing signal OX is applied to another terminal of NOR gate 122 as a complement zero crossing signal $\overline{OX}$ via OR gate 120. A reset signal $K_2$, derived from the output terminal of NOR gate 122, is applied to NOR gate 126. A noise-isolation capacitor 138 is connected between the output terminal of NOR gate 122 and return 136. The signals at the output terminals of NOR gate 122 and return 136. The signals at the output terminals of NOR gates 116 and 118 are wired-or connected at a junction 140 and applied as a set signal $J_2$ to NOR gate 124. The complement of a second threshold decision $\overline{T_2X}$ is applied to NOR gates 160 and 156 of doppler comparator 76 for a functional and logic operation. The image period signal $T_i$ and its complement $\overline{T_i}$ are also applied to NOR gates 160 and 156 of doppler comparator 76.

The clock-synchronized image period signal $T_i$ is applied further to a single shot 142 via an inverter 144. A pulse signal at the output of single shot 142 presets flip-flop 146, for example a JK flip-flop, via serially connected NOR gates 148, 150 if the first threshold decision 104 occurs during the half-cycle immediately prior to the first zero crossing. A reference period signal TR and its complement $\overline{TR}$ generated at the one terminal of flip-flop 146 is applied to a flip-flop 154 which is clocked by the clock pulse and operates as a reference period clock synchronizer. When flip-flops 146 and 154 are preset by the first zero crossing pulse from single shot 142 passed by NOR gate 150 controlled by first threshold decision logic 104, TR at the 0 terminal of flip-flop 154 goes low and passes clock pulses from buffer 94 through NOR gate 96 starting reference period countdown by reference counter 151, for example a 10 bit ripple through binary counter. When reference counter 151 completes reference period TR countdown, logic signals at the output terminals of counter 151 complement flip-flops 146 and 154 causing TR to go high which terminates the passage of clock pulses through NOR gate 96, thus generating a digital reference period TR which is a precise submultiple of the clock frequency, for example 800 Hz reference period with a ten bit reference counter 151 and 0.8192 M Hz clock buffer 94. The reference period signal $T_R$ and its complement $\overline{T_R}$ are applied to period differences 176 which performs the digital doppler measurement in terms of period differences which have a duty-cycle exactly proportional to frequency differences ($\Delta f = 1/T_i - 1/T_R = 1/T_R\,[(T_R - T_i)])/T_i$ even for large differences as shown at 178 in FIG. 4B because the period measurements are made at a rate determined by the input frequency $T_i^{-1}$.

Period differencer 176 comprises NOR gates 156, 158, 160, 162, 164 and 166. The second threshold decision complement signal $\overline{T_2X}$, which goes low if the threshold crossing occurs before the second zero crossing as well as the first zero crossing, is applied to one input terminal of NOR gates 156, 160, for example two input terminal NOR gates. The image period signal $T_i$ and its complement $\overline{T_i}$ are applied to the other input terminals of NOR gates 156, 160, respectively. The reference period signal $T_R$ and its complement $\overline{T_R}$ are applied to NOR gates 158 and 162, respectively. The signals at the output terminals of NOR gates 156 and 158 are wired-or connected at junction 168 into a down count signal D which is the functional and logic function: $\overline{T_R}\cdot\overline{T_i}\cdot T_2X$. The signals at the output terminals of NOR gates 160 and 162 are wired-or connected at a junction 170 into an up count signal U which is the functional and logic function: $T_R\cdot T_i\cdot T_2X$. The up down count signals are applied to up-down counter tracking register 80 of FIG. 2 and 46 of FIG. 1 via NOR gates 164 and 166, respectively. Tracking register 80 counts clock pulses up or down during the period differences U and D, respectively, thus accumulating digital image displacements in units of the reference reticle bars angular substense $\theta s$ with digital resolution of one part in $\theta s \div 1024$ with a ten bit reference counter 151, for example. Tracking register 80 stores displacement changes as a digital binary number, for example coded as a 15 bit (14 bit plus polarity) offset binary number. The register digital to analog converter 47 in FIG. 1 and 90 in FIG. 2 converts this number to a bipolar analog voltage suitable for stabilizing two-axis inertial platform 24 in FIG. 1. The timing relationships among the signals heretofore described are shown in FIGS. 4A and 4B.

From the foregoing, it will be realized that the first threshold decision occurs before the image period and permits the reference count down to begin and the second decision to occur. The second threshold decision occurs if both thresholds occur before the start and end of the image period. Doppler comparator 76 passes period errors, up or down counts, only if the second threshold decision occurs. The second threshold decision occurs only if the threshold crossings occur just before both the beginning and end of the image period.

In an alternate embodiment of digital differential comparator image frequency periods and reference frequency periods are compared using analog to digital dual slope integration techniques, whereby reference counter 151 is replaced by analog integration for reference period generation synchronized to image frequency.

In an alternate embodiment of digital up down counter tracking register 80, the time difference integrations of period differences is performed by an analog integrator into which bipolar currents are gated by period differences for integration by a capacitor such that the capacitor voltage represents time integral of period differences. Also threshold logic 74 performs an additional gating of the bipolar currents to provide switching functions 78 and 82.

An actual scene can be analytically visualized as the superposition of a large number of point sources, each producing a phasor. These phasors add randomly to produce a resultant phasor. The reticle within the FOV is a band-pass spatial filter. Thus the associated radiometric waveform is a narrow band signal with a Rayleigh distribution of the peaks. The frequency of this resultant digitally-encoded signal is digitally compared to the reference frequency by the doppler comparator 76. The doppler resultant is digitally weighted by the measurement accuracy optimally estimated by double threshold decision logic 74 from the instantaneous signal-to-noise. Thus the doppler rate is optimally averaged by the doppler comparator 74 which operates as a digital differential analyzer according to the angular information content. Digital differential analyzer (DDA) doppler comparator 42 shown in FIG. 1 is a functional representation of doppler comparator 76 in FIG. 2 which is shown in detail in FIG. 3 as described previously. Up-down counter tracking register 80 of FIG. 2 integrates doppler frequency differences $\Delta f$ under the control gate 82 by double threshold decision logic 74. Gate 82 is the functional representation of NOR gates 156 and 160 in period differencer 176. From the preceding description it is obvious that the tracking register 80 accumulates image displacement changes in units of spatial reference reticle substense $\theta s \div 1{,}024$ with a 10 bit reference counter 151, for example, because register 80 integrates doppler frequency differences which are measured in clock pulses encoded in units of $1{,}024 \times$ reference frequency $f_{AZ\ REF} = \Omega_{Az} \div \theta s$ shown in FIG. 1 at the output terminals of reference pickoff 36. The digital number in tracking register 80, for example an offset binary coded number, representing displacement changes is converted to a bipolar analog voltage by analog to digital converter 90. The signal generated by analog to digital converter 90 is a position change signal which operates to control inertial platform 24 for gyro-torquing stabilization by closed loop nulling of the position change signal from converter 90. An alternate embodiment of the invention for generating an absolute rate signal is shown in FIG. 5.

Figure 5:
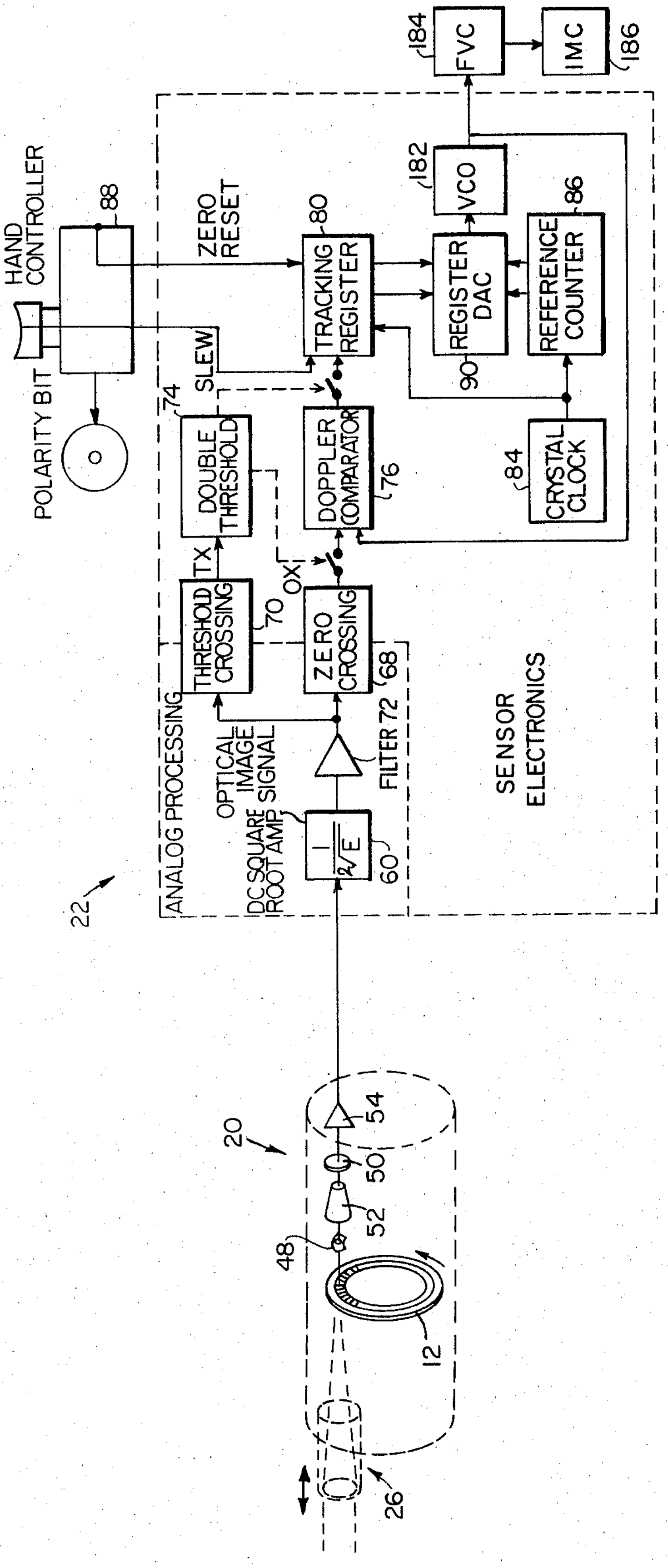
FIG. 5 is a block and schematic diagram of an alternate embodiment of an image-motion compensation stabilization system of the second type embodying the present invention.

Referring now to FIG. 5, there is shown an image stabilization system which generates an absolute rate signal, velocity ÷ height. Image stabilization system 180 is similar in construction and function to image stabilization system 10 with the exception that reticle 12 is stationary, thus the circuitry used for rotating reticle 12 is eliminated. In addition, the position change signal generated by register analog to digital converter 90 is applied to a voltage controlled oscillator 182. The frequency signal generated by voltage controlled oscillator 182 is applied as a feedback signal to doppler comparator 76 instead of the clock signal from crystal clock 84. The frequency signal at output terminal of oscillator 182 is directly proportional to image absolute angular velocity due to aircraft velocity over height (V/H) and applied to frequency to voltage converter 184 controlling an analog input image motion compensation device 186 for photographic applications. Alternately, oscillator 182 frequency is applied directly to a digital phase lock loop image motion compensation device. For simplicity, in view of the fact that the operation follows that of image stabilization system 10, with the aforementioned exceptions, reference should be had to the detailed description of image stabilization 10 for a fuller understanding of image stabilization system 180. It is understood that in this embodiment of a two axis sensor the aircraft provides orthogonally to each other as previously indicated by descriptions related to FIG. 1. The reticles are normally 45° from the aircraft velocity vector. Digital summation and differencing and ratioing of doppler comparator signals provide along-track and cross-track absolute velocities in cartesian or polar coordinates.

Since certain changes may be made in the foregoing description without departing from the scope of the invention herein involved, it is intended that all matter contained in the above description and depicted in the accompanying drawings be construed in an illustrative sense and not in a limiting sense. Further, it is intended that sensing applications which require multi-axis precise angular position and/or rate sensing for example range finding and range-rate sensing and three dimensional linear velocity and displacement sensing, are within the scope of the invention herein involved.

What is claimed is:

1. An image stabilization system comprising:

a. sensor means for imaging a field of view at a focal surface and for providing an optical image signal functionally related to motion of the representation of said field of view in said focal surface; and b. sensor electronic means operatively connected to said sensor means for generating stabilization signals related to said sensor means signal, said sensor electronic means including threshold decision logic means having an established threshold level, said threshold decision logic means operating to control said stabilization signals, said stabilization signals generated by said sensor electronic means when said threshold level is exceeded before each zero crossing of said optical image signal.

2. The image stabilization system as claimed in claim 1 wherein said sensor electronic means includes DC root amplifier means for receiving said optical image signal, said DC square root amplifier means operating as a photon-noise automatic gain control.

3. The image stabilization system as claimed in claim 2 wherein said sensor electronic means includes doppler comparator means and tracking register means, said doppler comparator means operatively connected to said DC square root amplifier means and said threshold decision logic means, said tracking register means operatively connected to said doppler comparator means, said doppler comparator means generating a difference signal related to motion of the representation of said field of view, said difference signal applied to said tracking register when said threshold is exceeded before each zero crossing of said optical image signal.

4. The image stabilization system as claimed in claim 3 wherein said sensor means includes rotating reticle means.

5. The image stabilization system as claimed in claim 4 including clock means for generating clock pulses for synchronizaing said rotating reticle means and said sensor electronic means.

6. The image stabilization system as claimed in claim 3 wherein said sensor electronic means includes:

a. threshold crossing analog to digital converter means operatively connected between said DC square root amplifier means and said threshold decision logic means; and b. zero crossing analog to digital converter means operatively connected between said DC square root amplifier means and said threshold decision logic means.

7. The image stabilization system as claimed in claim 6 wherein said sensor electronic means includes:

a. clock means for generating synchronization pulses;

b. reference counter means operatively connected to said clock means; and c. register digital to analog converter means operatively connected to said tracking register means;

d. said clock means operatively connected to said doppler comparator means and tracking register means;

e. said tracking register means read out through said register digital to analog converter means;

f. said register digital to analog converter means generating stabilization signals defining position change of the representation of said field of view.

8. The image stabilization system as claimed in claim 7 wherein said sensor means includes reticle means and means for rotating said reticle means and said sensor electronic means includes phase lock servo means for controlling said means for rotating, said reference counter means generating a reference signal which is applied to said phase-lock servo means.

9. The image stabilization system as claimed in claim 3 wherein said sensor means includes fixed reticle means.

10. The image stabilization system as claimed in claim 9 wherein said sensor electronic means includes:

a. clock means for generating synchronization pulses, said clock means operatively connected to said tracking register means;

b. counter means operatively connected to said clock means;

c. register digital to analog converter means operatively connected to said tracking register means; and d. voltage controlled oscillator means operatively connected between said register digital to analog converter means and said doppler comparator means;

e. said clock means operatively connected to said tracking register means;

f. said tracking register means read out through said register digital to analog converter means;

g. said register digital to analog converter means generating stabilization signals defining absolute rate of the representations of said field of view.

11. The image stabilization system as claimed in claim 1 wherein said sensor electronic means includes doppler comparator means and tracking register means, said doppler comparator means operatively connected to said threshold decision logic means, said tracking register means operatively connected to said doppler comparator means, said doppler comparator means generating a difference signal related to motion of the representation of said field of view, said difference signal applied to said tracking register when said threshold is exceeded before each zero crossing of said optical image signal.

12. The image stabilization system as claimed in claim 11 wherein said sensor means includes rotating reticle means.

13. The image stabilization system as claimed in claim 12 including clock means for generating clock pulses for synchronizaing said rotating reticle means and said sensor electronic means.

14. The image stabilization system as claimed in claim 11 wherein said sensor means includes apodization filter means.

15. The image stabilization system as claimed in claim 1 wherein said sensor electronic means includes doppler comparator means operatively connected to said threshold decision logic means, said doppler comparator means generating a doppler signal representing the period difference of a stationary image within said field of view and the moving image within said field of view by measuring the frequency period difference between a reference frequency period corresponding to said stationary image and an image frequency period corresponding to said moving image, one measurement being completed in one image period.

16. The image stabilization system as claimed in claim 15 wherein said sensor electronic means includes DC square root amplifier means for receiving said optical image signal, said DC square root amplifier means operating as a photon-noise automatic gain control.

17. The image stabilization system as claimed in claim 15 wherein said doppler comparator means includes counter means for digital comparison of said image frequency periods and said reference frequency periods.

18. The image stabilization system as claimed in claim 17 wherein said doppler comparator includes analog integration means for analog comparison of said image frequency periods and said reference frequency periods.

19. A radiation sensing system comprising:

a. sensor means for sensing radiation and for providing a signal related to said sensed radiation;

b. sensor electronic means communicating with said sensor means for providing stabilization signals related to said sensor means signal; and c. incremental gain variation means communicating with said sensor means and said sensor electronic means, the incremental gain of said incremental gain variation means varying inversely as the square root of said sensor means signal for photon-limited signal detection and estimation.

20. The radiometric sensing system as claimed in claim 19 wherein said incremental gain variation means is electronic DC square root amplifier means.

21. A radiation sensing system comprising:

a. sensor means for sensing radiation and for providing a signal related to said sensed radiation;

b. incremental gain variation means communicating with said sensor means, the incremental gain of said incremental gain variation means varying inversely as the square root of said sensor means signal for photon-limited signal detection and estimation.

22. The radiation sensing system as claimed in claim 21 wherein said incremental gain variation means is electronic DC square root amplifier means.

* * * * *